Figure 1:
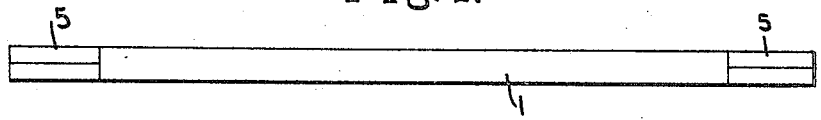

D. A. CLARK.
MANDREL FOR TIRE TUBES.
APPLICATION FILED JULY 1, 1921. RENEWED MAR. 8, 1922.

1,412,842.  Patented Apr. 18, 1922.

INVENTOR.
Don A. Clark
BY
Harold Elmo Smith
ATTORNEY.

UNITED STATES PATENT OFFICE.

DON A. CLARK, OF CLEVELAND, OHIO, ASSIGNOR TO THE CLYDE E. LOWE COMPANY, OF CLEVELAND, OHIO, A CORPORATION OF OHIO.

MANDREL FOR TIRE TUBES.

1,412,842. Specification of Letters Patent. Patented Apr. 18, 1922.

Application filed July 1, 1921, Serial No. 481,851. Renewed March 3, 1922. Serial No. 542,172.

*To all whom it may concern:*

Be it known that I, DON A. CLARK, a citizen of the United States, residing at Cleveland, in the county of Cuyahoga and State of Ohio, have invented a certain new and useful Improvement in Mandrels for Tire Tubes, of which the following is a full, clear, and exact description, reference being had to the accompanying drawings.

This invention relates to mandrels for tire tubes, and especially to those of straight cylindrical form as heretofore often made of seamless steel tubing. The objects of the invention are the inexpensive repair of such mandrels; the combination with such tubes of an incorrodible end piece; the provision of a repair part for such mandrels which shall not split or fail in strength; while further objects and advantages will appear as the description proceeds.

Heretofore straight mandrels used for making and curing the inner tubes of pneumatic tires have often consisted of lengths of seamless steel tubing cut to the requisite size and polished externally. The process of making such seamless tubing together with the soft initial nature of the metal necessarily employed results in a tube of very loose and porous texture which rapidly becomes corroded in use, particularly throughout the portion which is not covered by the rubber, as a result of which the mandrels have to be used for shorter and shorter tubes until the corroded area has so encroached upon the working surface that the whole tube has to be discarded. With a large tire manufacturing company the annual cost of replacing mandrels for this reason is very great, and a considerable portion of each mandrel discarded is still usable. By my invention this usable portion can be preserved and by being joined to an end portion which is not corrodible and is sufficiently stiff to carry the joint the life of the device is greatly extended.

In the drawing accompanying and forming a part of this application I have shown certain practical embodiments of my invention, these, however, being illustrative and not exhaustive of the structural variations which are possible.

Figure 2:
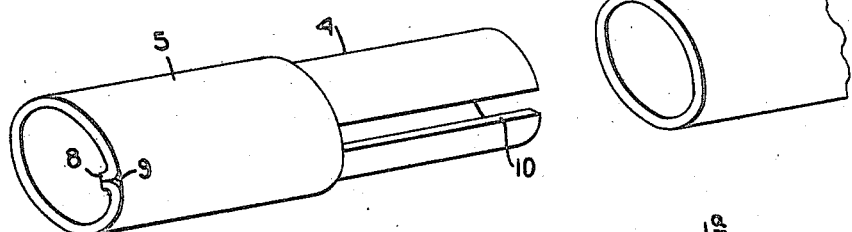
Figure 5:
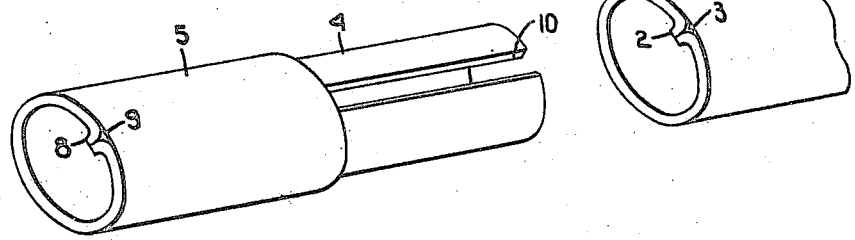
Figure 8:
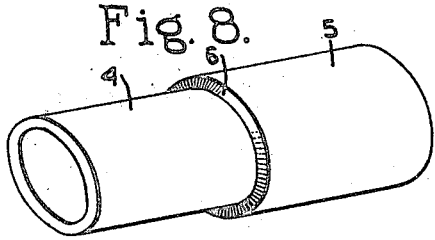
Figure 9:
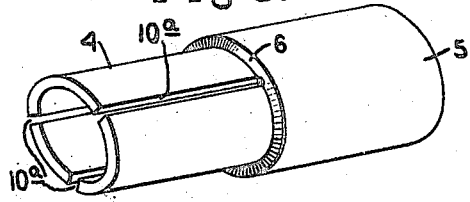
Figure 3:
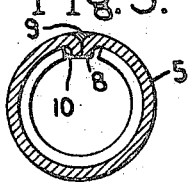
Figure 6:
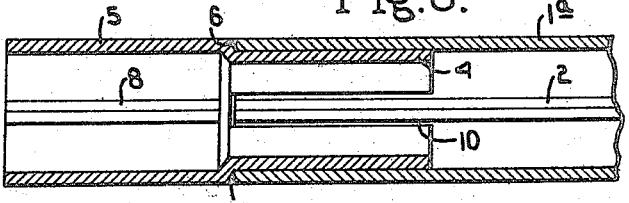
Figure 4:
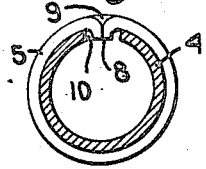
Figure 7:
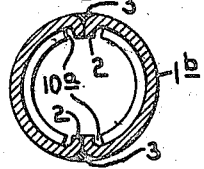

Fig. 1 illustrates a seamless mandrel having a seamed extension at each end; Fig. 2 is a perspective view drawn to enlarged scale showing one end of said mandrel and its extension member in separated relation; Figs. 3 and 4 are cross sectional views of the extension member taken at different points along its length; Fig. 5 is a perspective view of a similar extension member and a seamed, reinforced mandrel in separated relation; Fig. 6 is a longitudinal sectional view of a seam-reinforced mandrel and its extension after fastening together; Fig. 7 is a cross-sectional view and Figs. 8 and 9 are perspective views of modified forms of extension members.

Describing the parts by reference characters 1 in Figs. 1 and 2 represents a hollow cylindrical, tubular mandrel which in Figs. 1 and 2 is made of seamless tubing, while 1ª in Figs. 5 and 6 represents a similar mandrel made by circling a strip of sheet metal to tubular form leaving the margins to form the inwardly projecting stiffening rib 2 between which is an external groove 3 for weld metal; 1ᵇ in Fig. 7 shows a similar mandrel having two seams 2, 2, and grooves 3, 3. The extension member is formed with two portions of unequal external diameter integral with each other, the smaller portion 4 fitting snugly inside the mandrel and the larger portion 5 being flush with the exterior of the mandrel, the two portions being connected by the sloping portion 6, which co-operates with the end of the mandrel to form an outwardly opening transverse groove for the reception of weld metal 7.

Preferably this extension member is made of sheet metal, circled to tubular form, with the lips of the sheet projecting inwardly as shown at 8 to form a rib which resists buckling and the sloping groove between the lips being filled with weld-metal 9. This rib only extends the length of the larger portion 5, the lips of the seam being spaced apart throughout the portion 4 of smaller diameter so as to produce a longitudinal slot 10 in alignment with such rib. This facilitates the operation of drawing the metal to the smaller diameter and also enables the extension to be applied to a seamed mandrel, this slot receiving the stiffening rib. The extension may be made of seamless tubing either omitting the slot 10 or employing one or more of the same for facilitating the swaying of the tube walls. In Fig. 9 I have shown three such slots 10ª and in Fig. 7 two such slots 10ª.

The exterior form here described is produced by drawing in suitable dies by heavy presses. The welding is effected externally and the rough parts ground off. Preferably the mandrel, when of seamless steel, is first cut sufficiently short to enable this portion always to be covered by the rubber, and two seamed extension members employed, one at each end. Owing to its composition and surface treatment these are much less corrodible than the seamless steel but the latter being wholly covered by the rubber such a compound will last a long time. However I do not restrict myself either to a seamless mandrel, a seamed extension member, or the use of two such members to a mandrel or in any other way except as recited in my claims hereto annexed.

Having thus described my invention what I claim is:

1. A mandrel for tire tubes comprising a section of seamless steel tubing having welded to at least one end a section of seamed sheet steel tubing, the lips of the sheet at each side of the seam being turned inwardly to produce a longitudinal stiffening flange.

2. A mandrel for tire tubes comprising a section of seamless steel tubing having secured to at least one end a section of longitudinally-seamed, sheet-steel tubing, the margins of the sheet and the end thereof which abuts the seamless tube being sloped inwardly to provide flaring grooves, and weld-metal filling said grooves and adhering to the walls thereof.

3. A mandrel for tire tubes comprising, a section of steel tubing having secured to at least one end thereof a section of longitudinally-seamed, sheet-steel tubing, the margins of the sheet from which such last section is made projecting inwardly at each side of the seam to form an internal stiffening rib, and the space between the bases of such ribs being filled with weld metal, and a reduced extension carried by the end of such last section and entering said first mentioned section, said extension having a longitudinal slot in line with said rib and the transverse groove between the abutting ends of said sections being filled externally with weld metal.

4. An extension and repair member for tube mandrels consisting of a tubular section having two integral cylindrical portions connected by a narrow sloping portion, the external diameters of the cylindrical portion being equal the one to the outside and the other to the inside of the mandrel for which it is intended.

5. An extension and repair member for tube mandrels consisting of a tubular section having two integral cylindrical portions connected by a narrow sloping portion, the external diameter of the cylindrical portion being equal the one to the outside and the other to the inside of the mandrel for which it is intended and the smaller portion being longitudinally slotted.

6. An extension and repair member for tube mandrels consisting of a longitudinally seamed tubular section of sheet steel having two coaxial cylindrical portions of unequal diameter, the external diameters of said portions being equal the one to the outside and the other to the inside of the mandrel for which it is designed, the lips of the seam being bent inwardly throughout the portion having the larger diameter and having weld metal between them, and the lips of the seam being spaced apart throughout the portion of smaller diameter producing a longitudinal slot in alinement with said lips.

7. A mandrel for tire tubes comprising a section of steel tubing having at its end a tubular extension member whose external surface comprises two portions of unequal diameter connected by a narrow sloping portion, the smaller portion fitting snugly inside such first section, the larger portion being flush with the exterior of such first section, and the sloping portion forming with the end of said section an outwardly opening groove which is filled with weld metal.

In testimony whereof, I hereunto affix my signature.

DON A. CLARK.